United States Patent
Yamada et al.

(10) Patent No.: US 6,644,454 B2
(45) Date of Patent: Nov. 11, 2003

(54) RUNNING CONDITION CONTROL SYSTEM FOR VEHICLE AND METHOD

(75) Inventors: Noritaka Yamada, Mishima (JP); Akira Nagae, Susono (JP); Toshinobu Ota, Ama-gun (JP); Yasuhito Ishida, Anjo (JP)

(73) Assignees: Toyota Jidosha Kabushiki Kaisha, Toyota (JP); Aisin Seiki Kabushki Kaisha, Aichi (JP)

(*) Notice: Subject to any disclaimer, the term of this patent is extended or adjusted under 35 U.S.C. 154(b) by 0 days.

(21) Appl. No.: 10/043,209

(22) Filed: Jan. 14, 2002

(65) Prior Publication Data
US 2002/0096003 A1 Jul. 25, 2002

(30) Foreign Application Priority Data

Jan. 23, 2001 (JP) .......................... 2001-014790
Mar. 5, 2001 (JP) .......................... 2001-060324

(51) Int. Cl.⁷ .......................... F16H 59/36; F16H 59/68
(52) U.S. Cl. .................. 192/219.1; 192/219; 192/220.1
(58) Field of Search .......................... 192/219, 219.1, 192/220.1

(56) References Cited

U.S. PATENT DOCUMENTS

| 4,879,925 A | * 11/1989 | Taga et al. | 192/219.1 |
| 5,052,531 A | * 10/1991 | Bota | 192/219.1 |
| 5,819,897 A | * 10/1998 | Murata | 192/219.1 |
| 5,911,646 A | * 6/1999 | Tsutsui et al. | 192/13 A |
| 6,338,398 B1 | * 1/2002 | Eguchi | 188/134 |

FOREIGN PATENT DOCUMENTS

| JP | A 7-69102 | 3/1995 |
| JP | 07125622 | 5/1995 |
| JP | 08133030 | 5/1996 |
| JP | A 10-16745 | 1/1998 |

* cited by examiner

Primary Examiner—Rodney H. Bonck
Assistant Examiner—Eric M. Williams
(74) Attorney, Agent, or Firm—Oliff & Berridge, PLC

(57) ABSTRACT

An executed time of a backward slipping moderation control is counted by a timer, and after a predetermined period of time is elapsed, the control is terminated. Upon the termination of the control, a control of operation of a brake actuator is executed so that a wheel cylinder pressure is decreased with a gentle slope in comparison with a normal operation of the brake actuator for terminating the control. Where the backward slipping moderation control is executed by controlling a brake fluid pressure of the brake actuator, an acceleration $\alpha$ of a vehicle is estimated. If the acceleration is larger than a predetermined value, a target pressure P is increased, thus generating a relatively large braking force.

17 Claims, 11 Drawing Sheets

FIG. 11

| | WHEEL SPEED CHANGE | | |
|---|---|---|---|
| | − | 0 | + |
| TARGET PRESSURE P | MAINTAIN P←P | INCREASE P←P+P6 | RAPID INCREASE P←P+P7 |

RUNNING CONDITION CONTROL SYSTEM FOR VEHICLE AND METHOD

INCORPORATION BY REFERENCE

The disclosure of Japanese Patent Application No. 2001-14790 filed on Jan. 23, 2001, and Japanese Patent Application No. 2001-60324 filed on Mar. 5, 2001 including the specification, drawings and abstract are incorporated herein by reference in their entireties.

BACKGROUND OF THE INVENTION

1. Field of Invention

The invention relates to a running condition control system for a motor vehicle, which controls a vehicle's running condition when the vehicle slips or creeps backward on an ascending road, especially when an operator of the vehicle changes his or her foot position from a brake pedal to an accelerator pedal.

2. Description of Related Art

There is known a technique for automatically applying a braking force to a wheel of a motor vehicle, when the vehicle is slipping backward on an ascending road upon a change in a foot position, of an operator of the vehicle, from a brake pedal to an accelerator pedal. For example, JP-A-10-16745 discloses such a technique, in which the braking force acts on the wheels, when it is detected that the vehicle is slipping backward contrary to a forward driving operation selected by the operator, so that a speed of the backward slipping of the vehicle is decreased. The disclosed technique controls an amount of the braking force acting on the wheels so that the backward slipping speed of the vehicle does not exceed a predetermined upper limit. Therefore, the backward slipping speed of the vehicle is held within a constant range. However, in the disclosed technique, the magnitude of the braking force acting on the wheels is based upon the speed at which the vehicle is slipping backward and does not depend on the rate of increase of the backward slipping speed, i.e., acceleration, of the vehicle. Therefore, in the above case, the backward slipping speed of the vehicle may not be decreased sufficiently where the backward slipping speed of the vehicle is increasing at a high rate.

Further, a continuous execution of the braking force control upon backward slipping of the vehicle may mislead the operator into thinking that the controlled backward slipping speed is a natural backward slipping speed of the vehicle. The control for decreasing the backward slipping speed of the vehicle was originally adapted to operate when, for example, the operator changed his or her foot position from the brake pedal to the accelerator pedal to temporarily assist the operator in the intended operation. For the above reason, the control is required to cause the operator to appropriately operate the brake and accelerator pedals, while assisting the operator in operating them.

There is known a brake actuator used in a traction control system for limiting the slipping of the wheels during acceleration, or a turning behavior control system which applies a braking force to a predetermined wheel of the vehicle. The known brake actuator may be utilized for temporarily applying the braking force to the wheels in order to reduce the backward slipping speed of the vehicle. However, if the control system for decreasing the backward slipping speed of the vehicle is utilized for a longer period of time, an enhanced and more durable actuator would be required.

SUMMARY OF THE INVENTION

It is one object of the invention to provide a running condition control system for a vehicle, which is capable of inducing an operator of the vehicle to appropriately operate a brake pedal and an accelerator pedal, while assisting the operator in operating the vehicle when starting the vehicle on an ascending road.

It is another object of the invention to provide a running condition control system for a motor vehicle, which is capable of more effectively decreasing the speed at which the vehicle is slipping backward on the ascending road depending on a tendency of the vehicle to slip backwards.

To accomplish the above and/or other objects, one aspect of the invention provides a running condition control system for controlling a braking force applied to the wheels of the vehicle when an actual running direction of the vehicle is contrary to a running direction in which the vehicle is intended to run, in accordance with an operation selected by an operator of the vehicle. The running condition control system includes a vehicle operation state detector that determines whether the operation of the operator is a forward driving operation or a reverse driving operation, an actual running direction detector that detects an actual running direction of the vehicle, a braking device that applies the braking force to a predetermined wheel apart from a braking operation performed by the operator; and a controller that controls the braking device to apply the braking force to a wheel which rotates in the same direction as the actual running direction of the vehicle when the intended running direction of the vehicle, which is determined by the operation state detector, is contrary to the actual running direction of the vehicle detected by the actual running direction detector, and stops the braking device from applying the braking force when the braking device has been continuously controlled for a first predetermined period of time.

The controller controls the operation of the braking force applying device such that, when the operator's intended driving direction and the actual running direction of the vehicle are contrary to each other, that is, when the vehicle is slipping backward on the ascending road, the braking force is applied to a wheel rotating in the direction in which the vehicle is slipping backward. Thus, the backward slipping speed of the vehicle can be decreased. The controller terminates the control operation executed by the controller, when the controller has executed its control operation for a period in excess of the predetermined period of time. This arrangement is effective to induce the operator to operate the brake and accelerator pedals, while avoiding a continuous operation of the braking device for a long period of time and ensuring protection of the braking device.

In the running condition control system, when the braking force is continuously controlled for a period of time that is larger than a second period of time that is set smaller than the first period of time, the braking force applied to the wheel is reduced gently.

In the running condition control system, the controller decreases the pressure of the braking force such that the braking force applied to the wheel decreases along a gentle gradient instead of immediately terminating the braking force. This arrangement prevents a sudden change in the backward slipping speed of the vehicle, and makes it possible to notify the operator that the control for decreasing the backward slipping speed of the vehicle is being terminated. Accordingly, this arrangement provides a sufficient time for the driver to depress the brake pedal and/or the acceleration pedal.

In the running condition control system, the controller controls the magnitude of the braking force applied to the wheel, wherein the magnitude of the braking force applied is changed in accordance with the magnitude of the acceleration of the vehicle in the actual running direction.

In the running condition control system, the controller controls distribution of the braking force applied to the wheels located on an upper side of an inclined road and to the wheels located on a lower side of the inclined road such that the braking force applied to the wheels located on the lower side of the inclined road increases as a gradient of the inclined road becomes higher.

In the running condition control system including a rotating direction detector that detects a rotating direction of each of the wheels of the vehicle, the controller applies a first braking force to at least one wheel rotating in a direction that is contrary to the running direction intended by the operator, which is detected by the rotating direction detector, and applies a second braking force to at least one wheel rotating in a direction that is the same as the running direction intended by the operator, apart from a braking operation performed by the operator, the first braking force applied to the at least one wheel rotating in the direction that is contrary to the running direction intended by the operator is determined depending upon a running state of the vehicle; and the second braking force, applied to the at least one wheel rotating in the direction that is the same as the running direction intended by the operator, is determined depending upon the rotating state of the wheel.

BRIEF DESCRIPTION OF THE DRAWINGS

The invention will be described with reference to the accompanying drawings in which like numerals are used to represent like elements and wherein:

FIG. 11 is a diagram used for determining a desired control pressure P defined by a change in the wheel speed.

DETAILED DESCRIPTION OF PREFERRED EMBODIMENTS

Preferred embodiments of the invention will be described with reference to the accompanying drawings.

Embodiment 1

Figure 1:
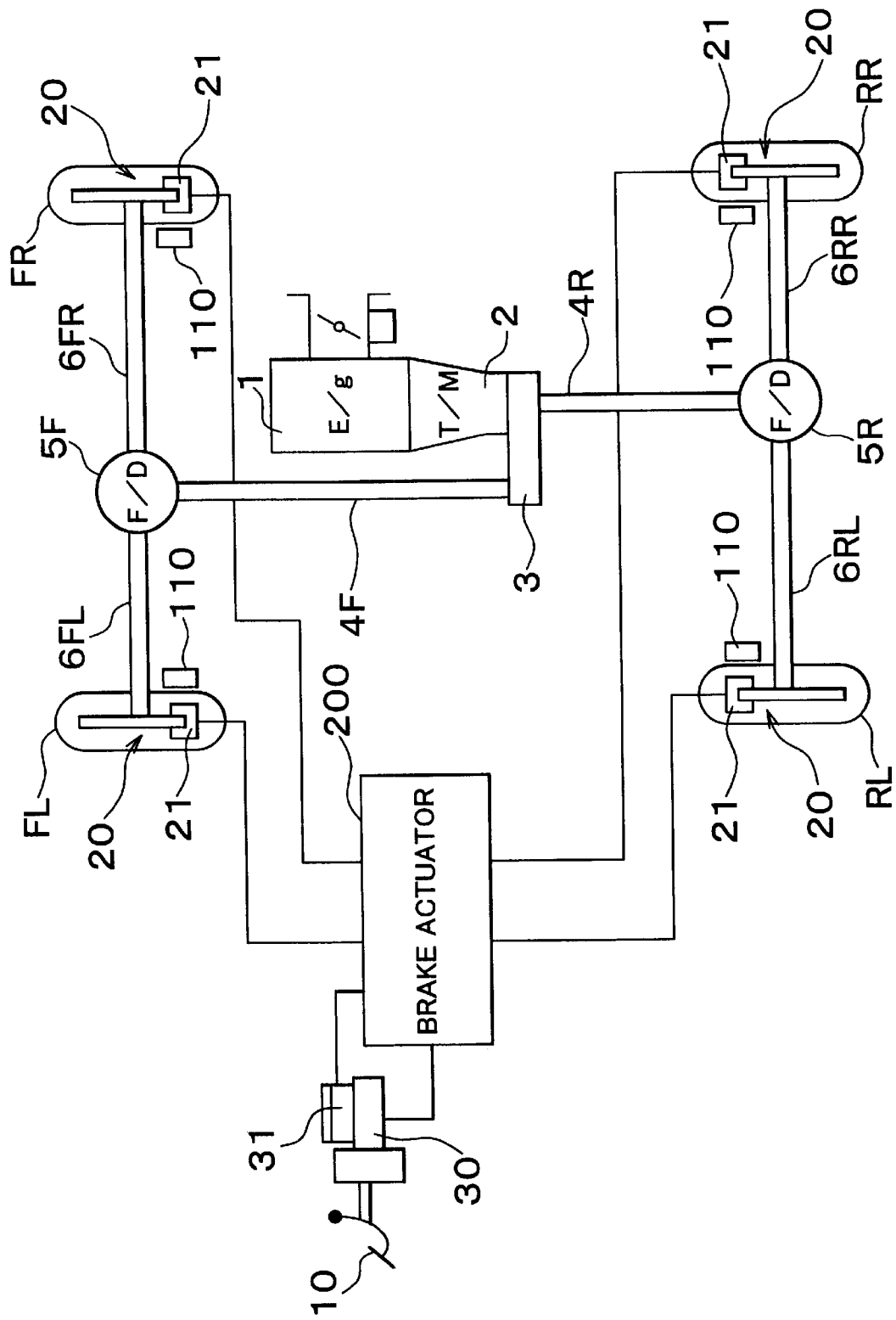
FIG. 1 is a schematic diagram illustrating a drive train and a hydraulic pressure control system of a motor vehicle incorporating a running condition control system of the invention.

FIG. 1 schematically shows a drive train of a 4-wheel-drive motor vehicle, incorporating a running condition control system according to a first embodiment of the invention. An output torque of an engine 1 is converted by a converter 2, and distributed into a front-wheel drive shaft 4F and a rear-wheel drive shaft 4R via a transfer 3. The front-wheel drive shaft 4F is connected via a front differential 5F to a front-left drive shaft 6FL and a front-right drive shaft 6FR, to which a front-left (FL) wheel and a front-right (FR) wheel are respectively connected. The rear-wheel drive shaft 4R is connected via a rear differential 5R to a rear-left drive shaft 6RL and a rear-right drive shaft 6RR, to which a rear-left (RL) wheel and a rear-right (RR) wheel are respectively connected. That is, the output torque of the engine 1 is transmitted to the wheels FL, FR, RL, RR according to the above-described mechanism. The transfer 3 includes selective operating positions, namely, a high-gear position for a high-speed transmission in which an output torque of the converter 2 is transmitted to the front and rear-wheel drive shafts 4F, 4R without changing its speed, and a low-gear position for a low-speed transmission in which the output torque of the converter 2 is transmitted to the front and rear-wheel drive shafts 4F, 4R with its speed reduced. The transfer 3 has a center differential gear accommodated therein for absorbing a speed difference between the front and rear-wheel drive shafts 4F, 4R.

Each of the front-left, front-right, rear-left and rear-right wheels FL, FR, RL, RR includes a hydraulically operated braking system 20. The braking system 20 includes a wheel cylinder 21 and a master cylinder 30, which are both filled with a working fluid and held in fluid communication via a hydraulic system. A brake actuator 200 is connected to the hydraulic system so as to increase or decrease a pressure of the working fluid independently of an operation of a brake pedal by an operator of the vehicle.

Figure 2:
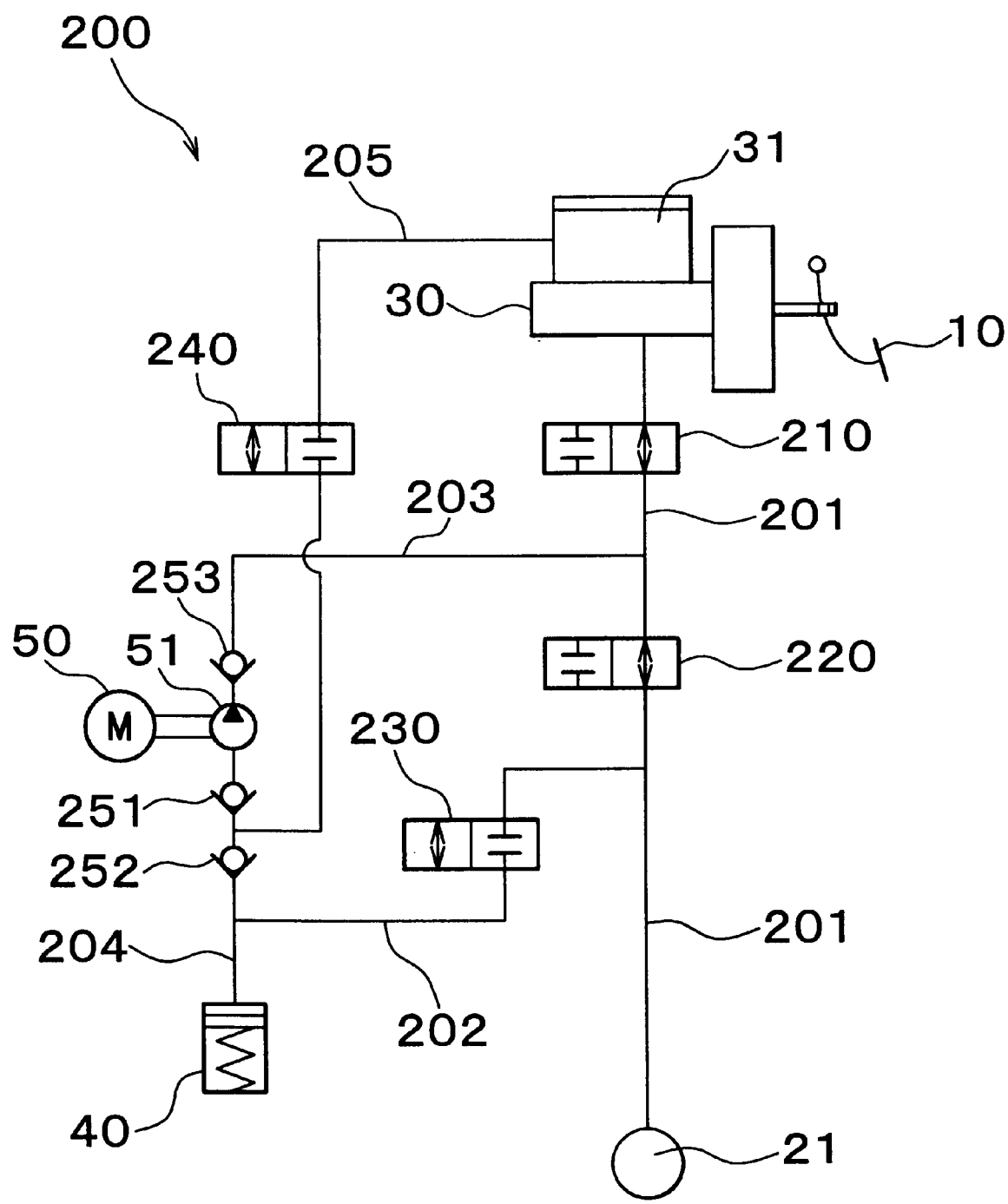
FIG. 2 is a schematic diagram illustrating a hydraulic pressure control system of a brake actuator for a braking force control for one of the wheels of the vehicle.

FIG. 2 schematically shows the brake actuator 200. The brake actuator 200 is operable to control the pressure of the working fluid in each of the braking systems 20 of the wheels FL, FR, RL, RR, independently of each other. Namely, hydraulic systems of the brake actuator 200 which are used for controlling the respective wheels FL, FR, RL, RR are identical to each other, so only one of them is representatively shown in FIG. 2.

Master cylinder 30 and the wheel cylinder 21 are held in fluid communication through a pipe 201, which is provided with an electrically operated disconnection valve 210, which is open when an electric current is not applied to the valve 210. The working fluid pressure is controlled by an electric current which is applied to this disconnection valve 210 to thereby close the disconnection valve 210 and inhibit the flow of the working fluid between the master cylinder 30 and the wheel cylinder 21. An electrically operated holding valve 220, which is open in its de-energized state, is connected to a portion of the pipe 201 located between the disconnection valve 210 and the wheel cylinder 21. The holding valve 220 is energized to thereby close the holding valve 220 so that the hydraulic system existing between the holding valve 220 and the wheel cylinder 21 is held in a closed state.

A pipe 202 is connected to the pipe 201 at a portion located between the holding valve 220 and the wheel cylinder 21 to allow the working fluid to flow through to a reservoir tank 40. This pipe 202 is provided with a pressure-regulating valve 230 (which is closed in the state where the electric current is not applied). The pressure-regulating valve 230 is selectively placed at its two operating positions by applying thereto a drive control signal having two states, i.e., an energizing state and a de-energizing state. Thus, the pipe 202 is able to be connected to and disconnected from the pipe 201 by controlling a duty ratio of the drive control signal applied to the pressure-regulating valve 230.

A pump 51, driven by an electric motor 50, serves as a hydraulic pressure source during control of the braking force. The pump 51 is connected at its outlet port to the pipe 201, at a portion located between the disconnection valve 210 and the holding valve 220, through a pipe 203. The pipe 203 has a check valve 253 on the side of the outlet port of the pump 51, to inhibit a counter flow of the working fluid through the pipe 203 in the direction toward the pump 51.

On the other hand, the pump 51 is connected at its inlet port to the reservoir tank 40 through a pipe 204. The pipe 204 has check valves 251, 252, to inhibit a counter flow of the working fluid through the pipe 204 toward the reservoir tank 40.

The pipe 204 is connected to a reservoir tank 31 through a pipe 205 connected thereto at a portion located between the check valves 251, 252. Thus, the pump 51 admits introduction of the working fluid stored in the reservoir tank 31 through the pipes 205, 204. The pipe 205 is provided with an electrically operated suction valve 240 (which is closed when the electric current is not applied). The suction valve 240 is operable to open and close the pipe 205.

The brake actuator 200 formed of the pump 51 and other various kinds of valves may be operated by a control system 100.

Figure 3:
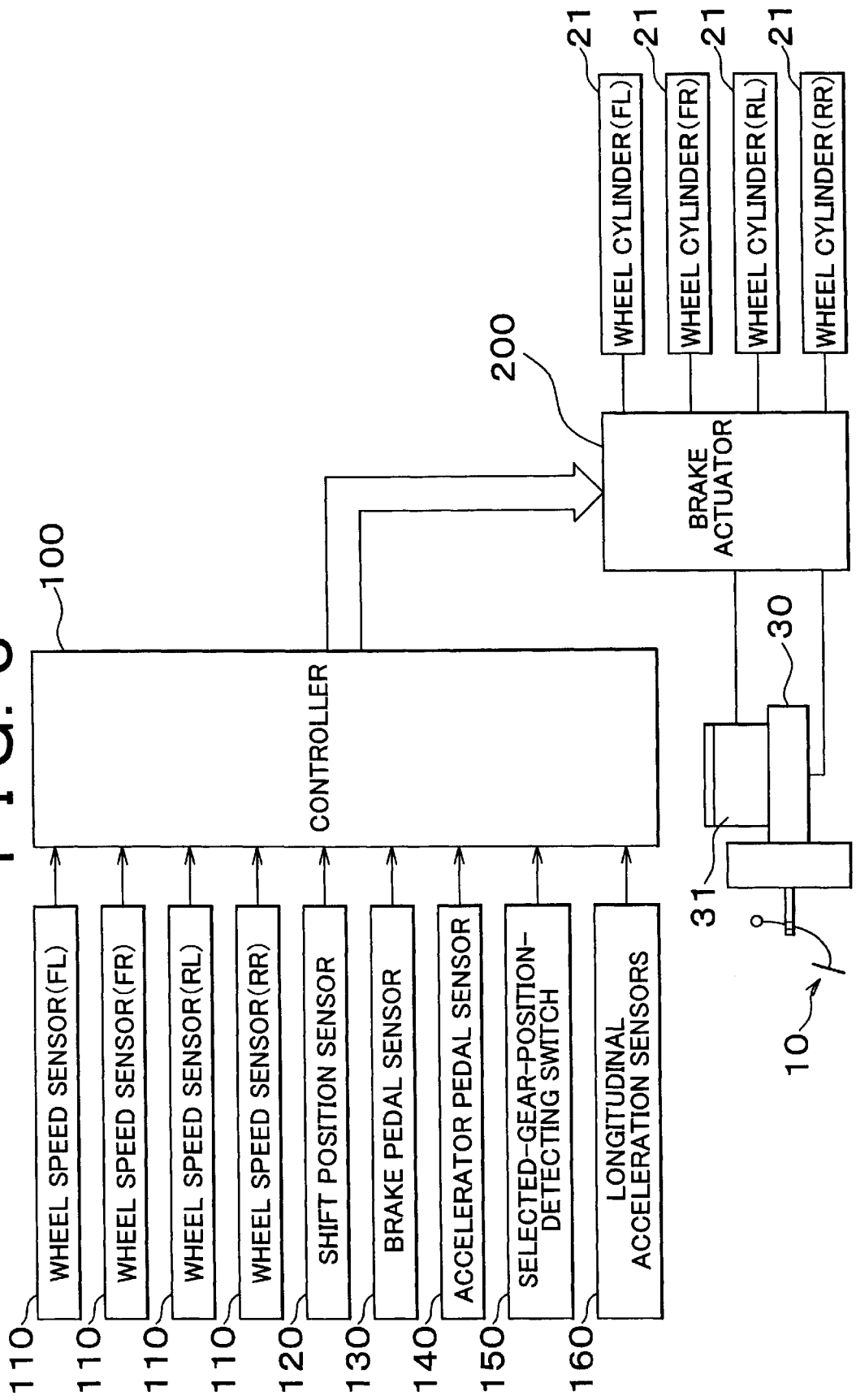
FIG. 3 is a block diagram illustrating an overall control system of an electric system and a hydraulic system of the running condition control system.

Referring to FIG. 3, the control system 100 receives output signals from various sensors relating to the running condition of the vehicle, for example, a wheel speed sensor 110 disposed for each of the wheels FL, FR, RL, RR in order to detect the rotation direction and speed of the corresponding wheel, a shift position sensor 120 for detecting a currently selected shift position of a shift lever, a brake pedal sensor 130 for detecting an amount of depression of a brake pedal 10, an accelerator pedal sensor 140 for detecting an amount of depression of an accelerator pedal, a selective gear position sensor 150 for detecting a gear position selected by a shift lever for the transfer 3, and a longitudinal acceleration sensor 160 for detecting the acceleration in the longitudinal direction of the vehicle. The wheel speed sensor 110 is formed of the sensor capable of detecting not only the rotation speed of the wheel but also the rotation direction thereof.

FIG. 2 shows the operation of the control system 100, especially the manner of controlling the brake actuator 200 when the vehicle, on an ascending road, is slipping backward. The control is executed in order to moderate the backward slipping of the vehicle. Hereinafter, this control of the operation of the brake actuator 200 is referred to as a "backward-slipping moderation control." The flowchart of FIG. 4 illustrates an example of a control routine of the backward-slipping moderation control to be executed by the control system 100 with respect to one of the wheels of the vehicle, and this routine is similarly executed with respect to the other wheels of the vehicle.

Figure 4:
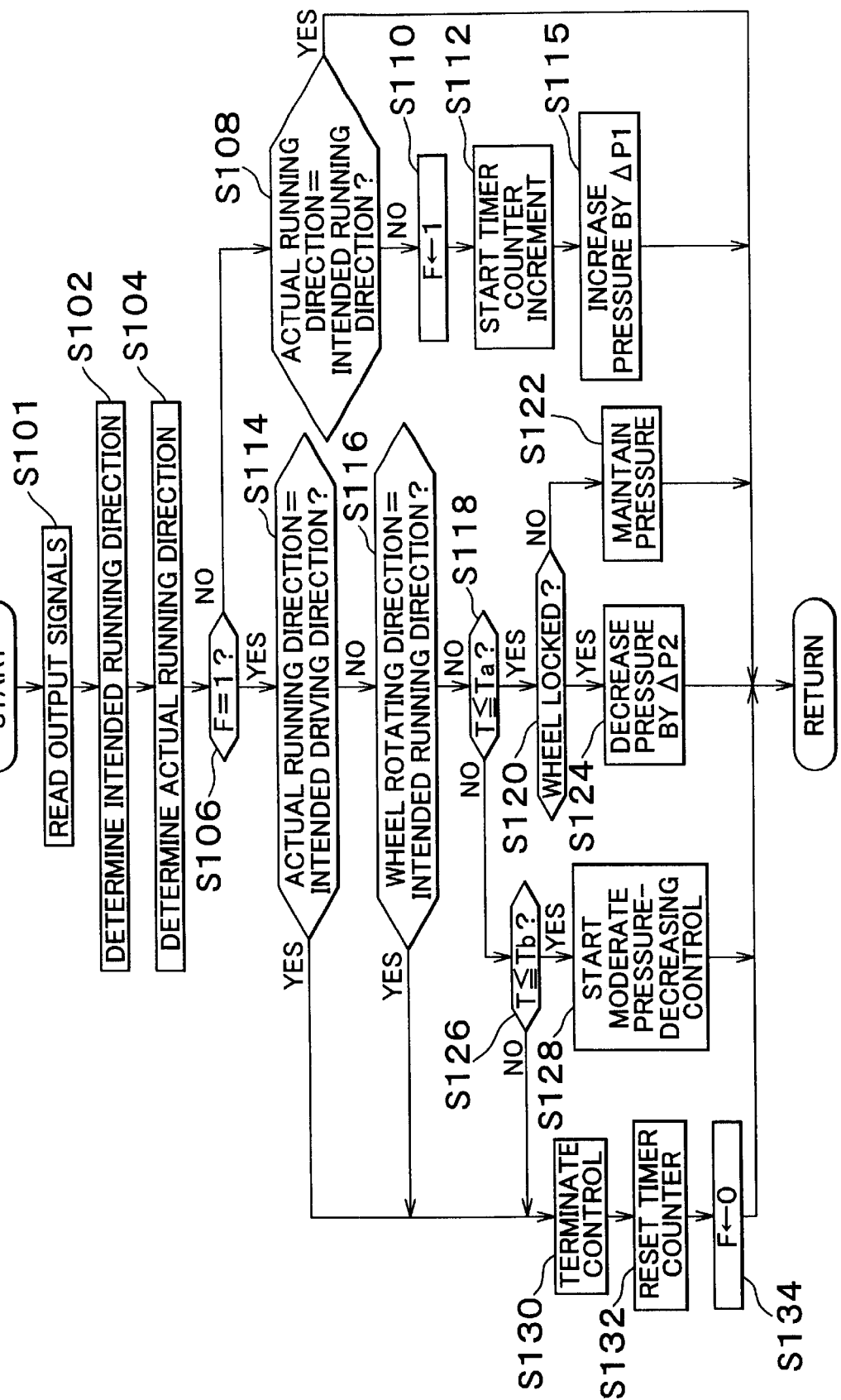
FIG. 4 is a flowchart illustrating a control routine of a backward slipping moderation control according to a first embodiment of the invention.

The routine in the flowchart shown in FIG. 4 starts when an ignition switch is turned on. First in step S101, output signals are received from the sensors (110, 120, 130, 140, 160) or switch (150). Step S102 is then executed to determine an operator's intended driving direction on the basis of a shift lever position detected by the shift lever position sensor 120. When the shift lever is placed on a position for forward driving of the vehicle, it is determined that the operator intends to drive in the forward direction. On the other hand, when the shift lever is placed on a position for backward driving of the vehicle, it is determined that the operator intends to drive in the backward direction.

In step S104, an actual running direction of the vehicle, i.e., forward or backward direction is determined.

When the vehicle starts on an ascending road surface, for example, the operator needs to change his or her foot position from the brake pedal 10 to the accelerator pedal. This may bring the temporary condition in which neither the brake pedal 10 nor the accelerator pedal is operated, thus causing the backward slipping of the vehicle. Further, each of the wheels FL, FR, RL, RR of the vehicle is rotating in the direction in which the vehicle is slipping. Accordingly, the actual running direction of the vehicle can be determined on the basis of the rotating direction(s) of a particular wheel or of all the wheels.

Since the running condition control system of this embodiment is applied to the 4-wheel-drive motor vehicle, it is possible to determine, in step S102, that the vehicle is actually running in a direction contrary to the operator's intended driving direction when at least one of the wheels is rotating in the direction contrary to the operator's intended driving direction.

After the actual running direction of the vehicle is determined in step S104, the process proceeds to step S106 where it is determined whether a flag F is set to 1, representing that the backward-slipping moderation control is currently being executed. The flag F is normally set to 0 in an initial state of the control routine. Accordingly, NO is obtained in step S106, and then the process proceeds to step S108.

In step S108, it is determined whether the operator's intended driving direction coincides with the actual running direction of the vehicle. When the operator's intended driving direction coincides with the actual running direction of the vehicle, YES is obtained in step S108, and then the process returns.

When the operator's intended driving direction and the actual running direction of the vehicle are contrary to each other, NO is obtained in step S108, and the process proceeds to step S110. In step S110, the flag F is set to 1 and the process proceeds to step S112 in which a timer for measuring the time elapsing from the start of the backward slipping moderation control is activated.

As described above, when the vehicle slips backward while neither the brake pedal 10 nor the accelerator pedal is depressed, the wheels FL, FR, RL, RR of the vehicle rotate in the direction that is the same as the backward slipping direction of the vehicle. Subsequently, in step S114, a pressure increasing control increases the pressure of the working fluid in the wheel cylinder 21, by a predetermined amount of pressure $\Delta$PI, so as to apply a relatively small braking force to the corresponding wheel in order to decrease the rotational speed of the wheel.

Referring back to FIG. 2, the brake actuator 200 is operated to increase the working fluid pressure in the wheel cylinder such that the disconnection valve 210 is energized to be closed, the suction valve 240 is energized to be open, and the motor 50 is operated to drive the pump 51 to transfer the pressurized working fluid to the wheel cylinder 21. In this condition, the working fluid is supplied to the wheel cylinder 21 through the pipes 203, 201. After enough time has elapsed for the pressure of the working fluid to increase by the predetermined amount of pressure ΔPI, the holding valve 220 is energized to be closed, thus increasing the pressure within the wheel cylinder 21 by ΔPI. The increase in the pressure by ΔII1, a predetermined increment value, results in an increase in the applied braking force which prevents the wheel from locking.

The aforementioned control is executed to control the braking system 20 of each of the wheels FL, FR, RL, RR. As a result, the braking force is applied to the wheels rotating in the direction the vehicle is slipping, thus decreasing the slipping speed of the vehicle.

Next, in steps S102 and S104, the direction of motion intended by the operator of the vehicle and the actual running direction of the vehicle are determined. As the flag F1 has been set to 1 upon execution of the backward slipping moderation control, YES is obtained in the subsequent step S106, and the process proceeds to step S115.

The control routine in the flowchart shown in FIG. 4 is executed on an assumption that the operator is changing his or her foot position from the brake pedal to the accelerator pedal. Therefore, it is preferable that the backward slipping moderation control be terminated when the operator depresses the accelerator pedal, and accordingly, the actual running direction of the vehicle is changed to coincide with a direction intended by the operator. In step S115, it is determined whether the vehicle direction intended by the operator coincides with the actual running direction of the vehicle on the basis of determination executed in step S102 and step S104. When the vehicle direction intended by the operator coincides with the actual running direction, YES is obtained in step S115, and the process proceeds to step S130 and subsequent steps. The control scheme for terminating the backward slipping moderation control in step S130 and subsequent steps will be described later.

It is preferable that the backward slipping moderation control be terminated when a certain wheel starts rotating in the direction intended by the operator resulting from the transfer of a driving force of the engine 1 even if the vehicle is still slipping. When the actual running direction is contrary to the direction intended by the operator, even if the braking force was applied in the previous routine, NO is obtained in step S115, and the process proceeds to step S116. In step S116, it is determined whether the rotating direction of the wheel to be controlled has coincided with the vehicle direction intended by the operator. When YES is obtained in step S116, the process proceeds to step S130 and subsequent steps. Accordingly, the backward slipping moderation control, applied to the respective wheels of the vehicle, will be terminated one after another when the rotating direction of the wheel coincides with the vehicle direction intended by the operator, who depresses the accelerator pedal.

While the wheel rotates in the backward slipping direction of the vehicle, NO is obtained in step S116, and the process proceeds to step S118.

In step S118, it is determined whether a counter value T of the timer started in step S112 is equal to or smaller than a predetermined threshold value Ta. The threshold value Ta is set so as to prevent the operator from being misled into thinking that the vehicle is allowed to run backward on an uphill road at a current backward slipping speed, as well as to protect various valve systems such as the disconnection valve 210, constituting a part of the brake actuator 200, from the heat generated by continuous energization of those valve systems. The threshold value Ta may be determined by considering the design concept, the durability of the brake actuator 200 and the like. The threshold value Ta may be set to about 3 seconds, but it is not limited to this value.

If the counter value T of the timer is equal to or smaller than the threshold value Ta, an affirmative decision YES is obtained in step S118, and the process proceeds to step S120.

In the case where the backward slipping moderation control is appropriately operated, the wheel gradually rotates backward on the uphill road. However, when a frictional force generated between the surface of the road and the surface of the wheel is relatively small, e.g., when the vehicle is on a road with a relatively low friction coefficient ($\mu$), the wheel may become locked even if the braking force determined in step S114 is applied to the wheel. Therefore, in step S120, it is determined whether the wheel to be controlled is not rotating because it is locked.

If the wheel is not locked, NO is obtained in step S120, the process proceeds to step S122, in which the wheel cylinder pressure determined in the previous routine is maintained.

On the other hand, if the wheel is locked, YES is obtained in step S120, and the process proceeds to step S124. In step S124, a pressure decreasing control is executed to decrease the pressure of the working fluid in the wheel cylinder by an amount of ΔP2 (ΔPI>ΔP2).

Referring back to FIG. 2, the brake actuator 200 is operated to execute the pressure decreasing control such that the pressure-regulating valve 230 is operated based on the drive control signal, whose duty ratio is controlled, is applied thereto. The operation of the pressure-regulating valve 230 allows the working fluid stored between the holding valve 220 and the wheel cylinder 21 to flow through the pressure-regulating valve 230 into the reservoir tank 40. This operation of the pressure-regulating valve 230 is executed for a predetermined period of time, which is long enough to assure a decrease in the working fluid pressure in the wheel cylinder 21 by ΔP2. After the predetermined period of time has elapsed, the pressure-regulating valve 230 is de-energized and closed, thus keeping the pressure of the working fluid in the wheel cylinder 21 decreased by ΔP2.

Next, if YES is obtained in step S120, indicating that the wheel to be controlled is locked, the process proceeds to step S124 in which the pressure decreasing control, discussed above, is executed. The pressure decreasing control executed in step S124 is repeated until the wheel is unlocked. The aforementioned control routine allows for the reduction of the rotating speed of the wheel rotating in the backward slipping direction and prevents the wheel from locking.

Referring back to S118, if NO is obtained in step S118, indicating the backward slipping moderation control has not been executed for a period of time exceeding the threshold value, Ta, the process proceeds to step 126 in which it is determined whether the counter value T of the timer is equal to or less than another predetermined threshold value Tb (Ta≦Tb). The threshold value Tb represents a period of time that the moderate pressure decreasing control in step S128 may be continuously executed. The threshold value Tb will preferably represent the estimated period of time necessary for the operator to change his or her foot position from the brake pedal 10 or the acceleration pedal, and to ensure that the pressure of the working fluid in the wheel cylinder 21 decreases along a gentle decompression gradient, preventing the decrease in pressure along a steep gradient. The threshold value Tb may be set to about 8 seconds, but it is not limited to this value.

Next, in step S126, it is determined whether the counter value T of the timer exceeds Ta and is equal to or less than the threshold value Tb, that is, if Ta<T≦Tb. If YES is obtained in step S126, the process proceeds to step S128, in which a moderate pressure decreasing control is executed in order to terminate the backward slipping moderation control in a gradual manner.

Figure 5:
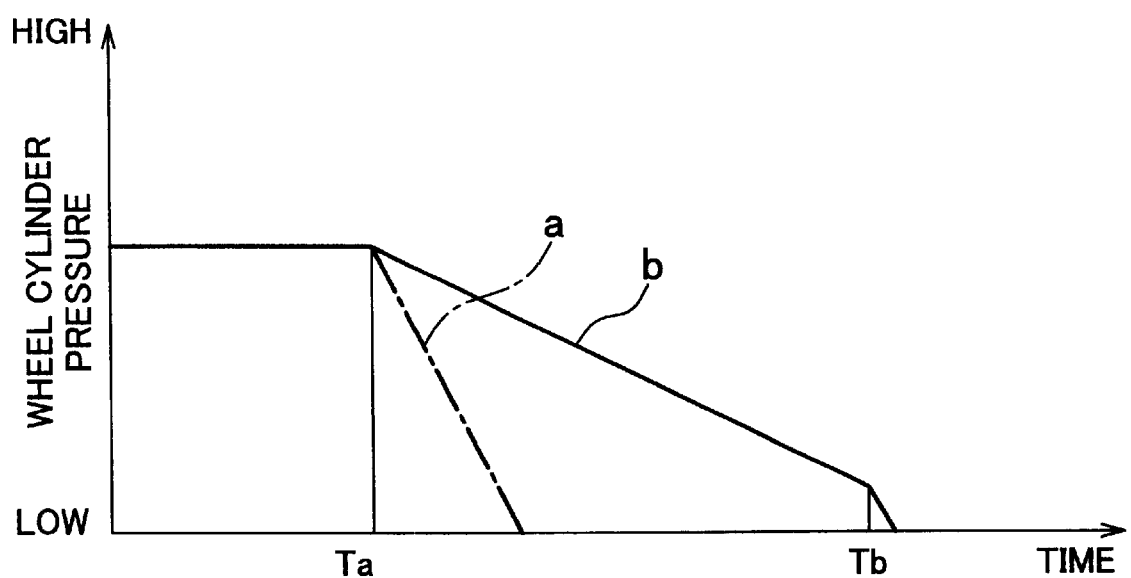
FIG. 5 is a graph illustrating a relationship between a wheel cylinder pressure and the time taken for executing the backward slipping moderation control.

In general, in order to stop controlling the brake actuator 200, the motor 50 is stopped and the valve systems such as the disconnection valve 210, the holding valve 220, the pressure regulating valve 230, and the suction valve 240 are all de-energized. Accordingly, the disconnection valve 210 and the holding valve 220 are opened, while the pressure-regulating valve 230 and the suction valve 240 are closed. As shown in the graph of FIG. 5, the working fluid pressure in the wheel cylinder is maintained at a predetermined value until an elapse of a predetermined period of time Ta from the time the backward slipping moderation control started at the time T (=0), and the operation of the brake actuator 200 is terminated immediately after an elapse of the predetermined time Ta. In this case, the pressure of the working fluid in the wheel cylinder is rapidly decreased as indicated by a chain line "a" in FIG. 5.

In addition, the moderate pressure decreasing control is executed in step S128 such that the pressure decreases more gently as indicated by a solid line "b" in comparison to the chain line "a." The brake actuator 200 is operated for executing the moderate pressure decreasing control in which the pressure regulating valve 230 is operated, based on the drive control signal having a duty ratio of about 10%, while the disconnection valve 210 and the holding valve 220 are energized to be closed. It is noted that the pressure regulating valve 230 is held in its full-open position upon application of the drive control signal having a duty ratio of 100%.

The moderate pressure decreasing control, as described above, allows the working fluid stored between the holding valve 220 and the wheel cylinder 21 to be discharged to the reservoir tank 40 through the pipe 202, and the pressure regulating valve 230 suitably controls the flow rate of the working fluid. Therefore, the pressure of the working fluid in the wheel cylinder 21 is gradually decreased as indicated by the solid line "b" shown in FIG. 5.

During execution of the moderate pressure decreasing control, if NO is obtained in step S126, that is, if the counter value T of the timer exceeds the threshold value Th, the process proceeds to step S130 and subsequent steps so as to normally execute the termination process of the backward slipping moderation control. In the termination process, the operation of the motor 50 is stopped, while all the valve systems are de-energized. That is, the disconnection valve 210 and the holding valve 220 are open, while the pressure-decreasing valve 230 and the suction valve 240 are closed. In this condition, the pressure of the working fluid in the wheel cylinder 21 is decreased with a relatively large pressure decompression gradient. In this respect, the use of the predetermined threshold value Tb makes it possible to start the termination process with the pressure of the working fluid being sufficiently reduced, thus preventing the braking force from experiencing a sudden and drastic change.

Subsequently, the process proceeds to step S132 where the counter value of the timer is reset. Then in S134, the flag F is reset to "0", thus returning for the next cycle of the control routine.

Further, steps S130–S134 for terminating the backward slipping moderation control are executed when the actual vehicle running direction of the vehicle coincides with the intended driving direction, that is, YES is obtained in step S115, or when the rotating direction of the wheel coincides with the intended driving direction, that is, YES is obtained in step S116 during the time period when the counter value T of the timer is equal to or less than Th, or when NO is obtained in S126 because the counter value T of the timer exceeded the threshold value Tb.

In addition, steps S130–S134 are executed to terminate the backward slipping moderation control when a depression of the brake pedal 10 by the operator is detected during the execution of the backward slipping moderation control (flag F=1). However, this step is not shown in the flowchart of FIG. 4.

Further, with respect to the running condition control system according to this embodiment of the invention, the pressure regulating valve 230 is operated based on the drive control signal having a duty ratio of 10% during a time when the counter value T exceeds the threshold value Ta and is equal to or less than Tb, that is, Ta<T≦Tb. The duty ratio, however, does not have to be kept constant so long as the resultant pressure decompressed gradient is lower than the pressure decompressed gradient represented by the chain line "a" shown in FIG. 5. For instance, the duty ratio of the drive control signal may be gradually changed.

Further, the actual running direction of the vehicle detected in step S104 need not be determined exactly as discussed above. For instance, when three wheels are rotating in the same direction, that direction may be determined as the actual running direction of the vehicle. In the case of a 2-wheel-drive motor vehicle, a rotating direction of an idler wheel, i.e., the driven wheel, may be determined as the actual running direction of the vehicle.

In addition, the actual running direction of the vehicle may be directly detected using a ground speed sensor. More specifically, the ground speed sensor installed on the vehicle generates an ultrasonic signal at a predetermined frequency toward the road surface and back towards of the vehicle, which receives the reflected wave. When the frequency of the reflected wave is higher than that of the ultrasonic signal, it can be determined that the vehicle is in a reverse drive operation. When the frequency of the reflected wave is lower than that of the ultrasonic signal, it can be determined that the vehicle is in a forward drive operation.

In the first embodiment, the control routine shown in the flowchart of FIG. 4 starts when the ignition switch is turned ON. The control routine may be started, for example, when the shift lever is selected on any one of forward or reverse shift positions, and the brake pedal 10 and the acceleration pedal are not depressed.

In the first embodiment, the braking force is controlled by the pressure of the working fluid. However, the braking force may be controlled by operating an electronic motor brake to generate a braking force. In this case, when the counter value T exceeds the threshold value Ta and is equal to or less than the threshold value Th, that is, Ta<T≦Tb, the moderate pressure decreasing control is executed such that the braking force generated by the electronic braking system is gently decreased and thus, has a pressure-force decreasing gradient lower than that of the gradient of a normal terminating operation.

In the first embodiment, the brake actuator in the vacuum booster brake system is employed as shown in FIG. 2. Any type of brake actuator may be employed so long as the brake actuator is capable of applying a braking force apart from the braking operation performed by the operator of the vehicle. Therefore, a brake actuator of a hydro-booster type braking system and an actuator capable of generating the braking force based on an operation of the motor may be employed.

The above-described running condition control system for a vehicle includes the controller which is operable to apply the braking force to the wheel rotating in the actual running direction of the vehicle, when the driving direction intended by the operator is contrary to the actual running direction of the vehicle. The system further includes the termination of the controller's control of the braking device when the control has been continuously executed for a predetermined period of time.

This arrangement is effective to induce the operator to operate the brake and accelerator pedals, while preventing the operator from being misled into thinking that the vehicle's backward slipping speed is under control. This arrangement is also effective to avoid a continuous operation of the braking device for a long period of time, thus ensuring protection of the braking force applying device.

The above-described running condition control system for a vehicle permits the termination controller to control the braking device such that the braking force applied to the wheel decreases with the gradient gentler than the gradient in the case in which the control of the braking force applying device is immediately terminated.

This arrangement makes it possible to prevent a relatively large change in the backward slipping speed of the vehicle, and makes it possible to notify the operator that the control for decreasing the backward slipping speed of the vehicle is terminated. This arrangement further provides a sufficient time for the operator to depress the brake pedal or the acceleration pedal.

Embodiment 2

Figure 6:
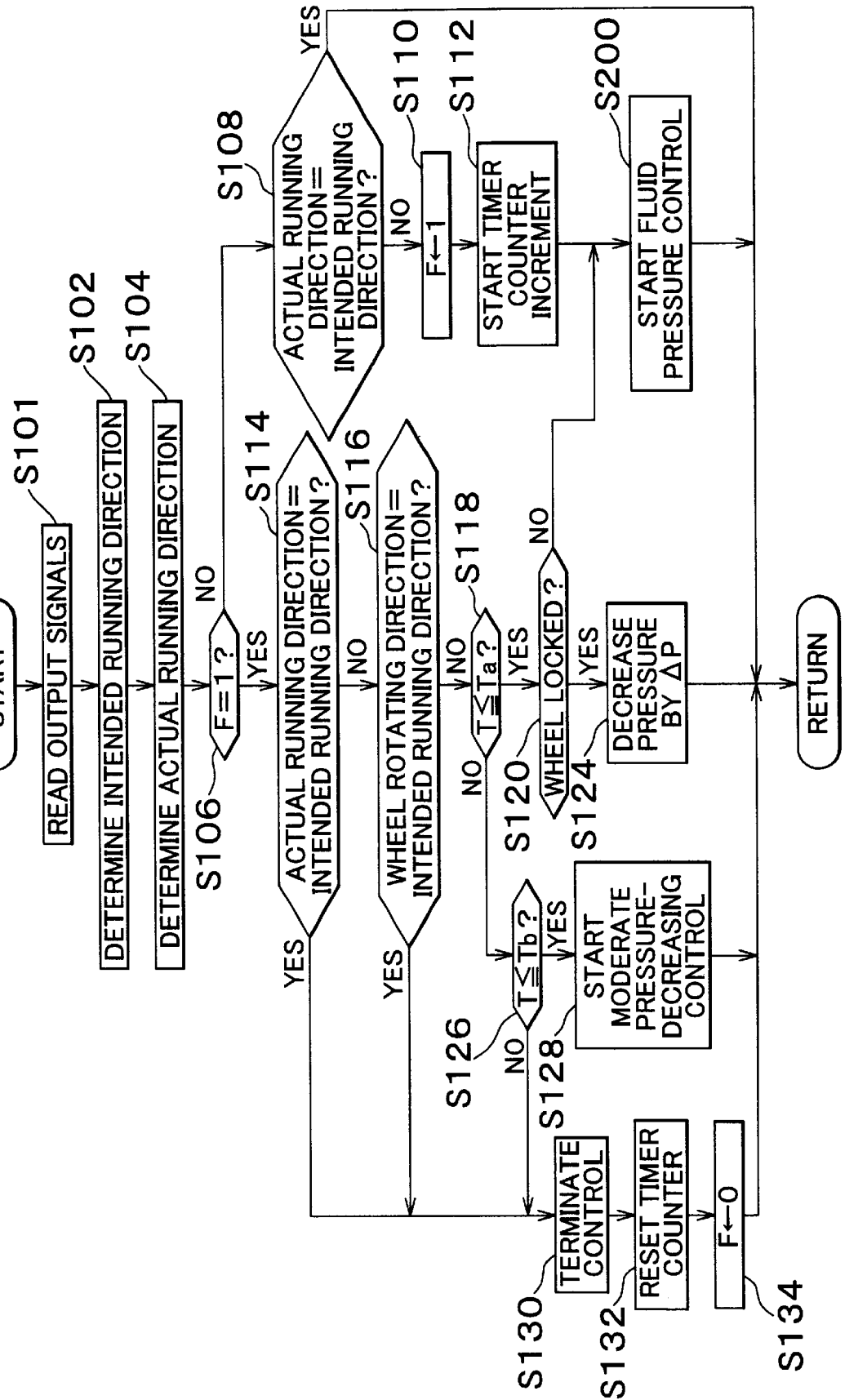
FIG. 6 is a flowchart illustrating a control routine of a backward slipping moderation control according to a second embodiment of the invention.

FIG. 6 shows a flowchart illustrating a control routine according to a second preferred embodiment of the invention, which is to be executed when the vehicle is slipping backwards on an ascending road in order to moderate the backward slipping condition of the vehicle. Control flows executed in steps S112–S200, S120–S124 and S120–S200 will be described in detail. The description with respect to steps identical to those in the control routine of the flowchart in FIG. 4 according to the first embodiment will be omitted.

Referring to the flowchart of FIG. 6, in step S112, the timer is started for measuring the time elapsing after the start of the backward slipping moderation control. The process then proceeds to step S200 in which a fluid pressure control is executed with respect to a wheel which is to be controlled according to the flowchart shown in FIG. 6. The fluid pressure control is executed to increase the pressure of the working fluid in the wheel cylinder 21 to a target pressure P, which will be described later.

Referring back to FIG. 2, the brake actuator 200 is operated under the pressure increasing control such that the disconnection valve 210 is energized to be closed, the suction valve 240 is energized to be open, and the motor 50 is operated to drive the pump 51 to transfer the working fluid under pressure to the wheel cylinder 21. In this condition, the working fluid is supplied to the wheel cylinder 21 through the pipes 203, 201. Upon an elapse of time sufficient for the pressure of the working fluid in the wheel cylinder 21 to reach a target pressure P, the holding valve 220 is energized to be closed so as to keep the pressure of the working fluid in the wheel at the target pressure P. A specific manner for setting the target pressure P will be described later.

The aforementioned control is executed for all braking systems of the wheels FL, FR, RL, RR, such that a suitably controlled braking force is applied to each of those wheels, rotating in the direction in which the vehicle is slipping backward. As a result, the backward slipping speed of the vehicle may be decelerated.

Subsequently in steps S102 and S104 of the flowchart of FIG. 6, the driving direction intended by the operator, and the actual running direction of the vehicle are determined, respectively. If the backward slipping moderation control has already been started, the flag F is set to 1. Therefore, YES is obtained in the next step S106. The process then proceeds to step S114.

In step S120 of the control scheme from step S106, it is determined whether the wheel to be controlled is locked. If NO is obtained in step S120, that is, the wheel is not locked, the process proceeds to step S200. In step S200, the pressure of the working fluid in the wheel cylinder is controlled to be set to the target value P.

On the other hand, if YES is obtained in step S120, that is, the wheel is locked, the process proceeds to step S124. In step S124, the pressure of the working fluid in the wheel cylinder is decreased by ΔP.

Referring back to FIG. 2, the braking actuator 200 is operated under the pressure decreasing control such that the pressure regulating valve 230 is operated based on the drive control signal having a predetermined duty ratio. In this condition, the pressure-regulating valve 230 allows the working fluid stored between the holding valve 220 and the wheel cylinder 21 to flow to the reservoir tank 40. Upon an elapse of a time period for decreasing the pressure by ΔP, the pressure-regulating valve 230 is de-energized to be closed so as to keep the state in which the pressure of the working fluid in the wheel cylinder has been decreased by ΔP.

Thus, when the wheel to be controlled is locked, the process proceeds to step S124 in which the pressure decreasing control is executed. The pressure decreasing control in step S124 is repeatedly executed until the wheel becomes unlocked. The aforementioned control makes it possible to decrease the rotating speed of the wheel rotating in the direction in which the wheel is slipping, while preventing the wheel from locking.

As the control scheme with respect to step S126 and subsequent steps are the same as those corresponding to the flowchart shown in FIG. 4, the description with respect to the control scheme will be omitted.

Figure 7:
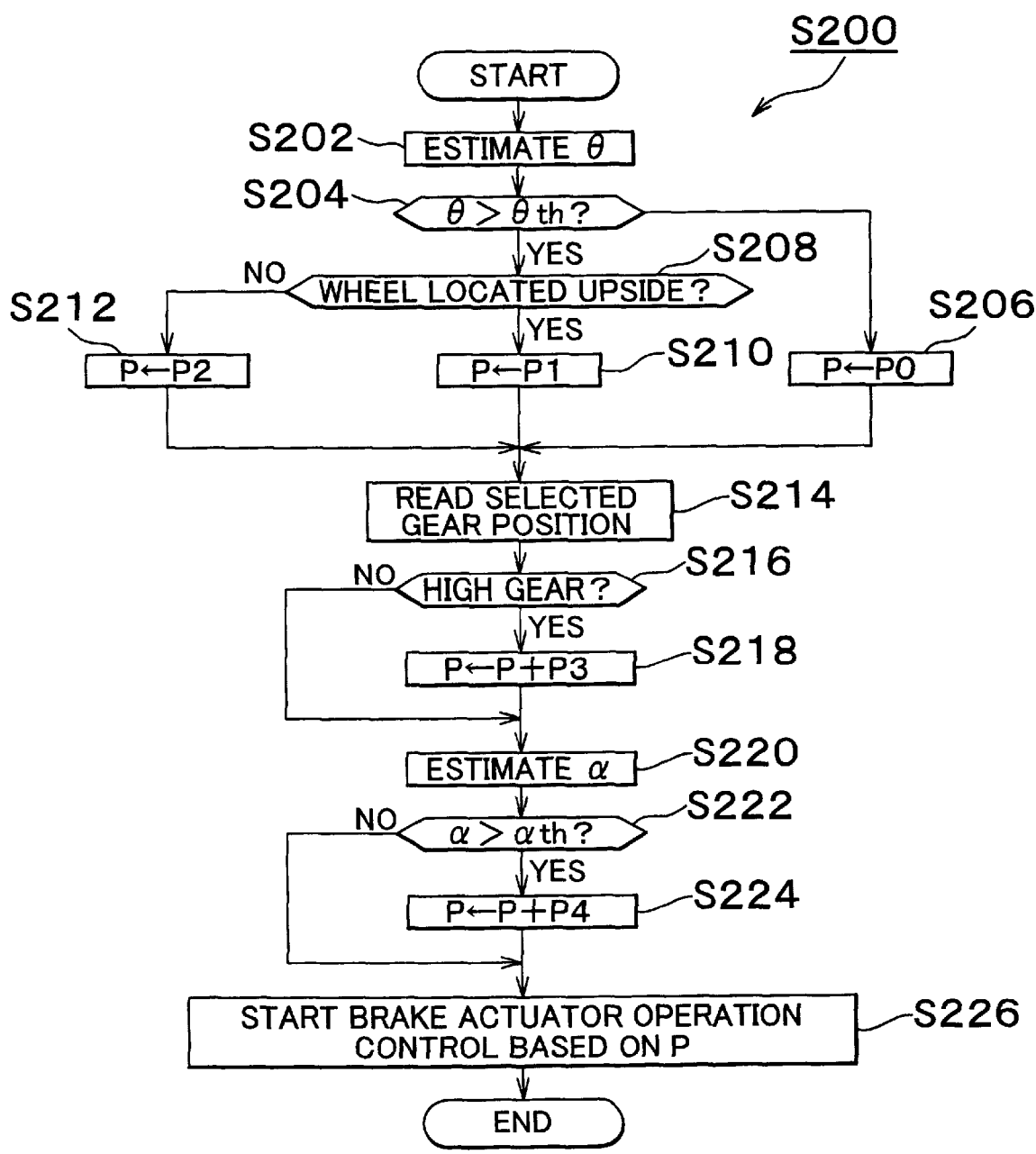
FIG. 7 is a flowchart illustrating one example of a hydraulic control sub-routine to be executed in step S200 of the flowchart shown in FIG. 6.

FIG. 7 shows a control scheme of a pressure decreasing control to be executed in step S200, shown in FIG. 6. Like the control routine shown in the flowchart of FIG. 6, the flowchart of FIG. 7 shows the control with respect to one of the wheels of the vehicle.

Since a distribution of a load to the respective wheels FL, FR, RL, RR changes depending upon a gradient of the ascending road surface on which the vehicle's running, the pressure of the working fluid in the wheel cylinder 21 of each of the wheels may be regulated depending upon the gradient of the road. In step S202, a gradient θ of the ascending road surface is estimated, for example, by utilizing front and rear acceleration sensors 160 which detect the acceleration of the vehicle body in both the forward and backward directions. Since the vehicle's acceleration in the forward and backward directions varies depending on the gradient of the ascending road surface, the gradient θ of the ascending road surface can be directly estimated based on the output signal of the front and rear acceleration sensors 160. Alternatively, the gradient of the ascending road surface may be estimated by utilizing an inclined angle sensor, a state of change in the wheel rotating speed of the vehicle that rotates backward on the ascending road, or a geometrical information available from a navigation system installed on the vehicle.

In S204, it is determined whether the estimated gradient θ obtained in step S202 is larger than a predetermined threshold value θ th. When the estimated gradient θ is equal to or smaller than the threshold value θ th, that is, the road has a gentle gradient, (NO in step S204), it is assumed to have no great change in the load distribution to the wheels. Therefore, the process proceeds to step S206 in which the target pressure P (a desired pressure in the wheel cylinder) is set to a predetermined value P0. The predetermined valve P0 is determined in advance in an attempt to apply a suitable braking force to the wheel, on the ascending road, having a gradient not larger than the threshold value θ th, to prevent the wheel from being locked.

On the other hand, if the estimated gradient θ is larger than the threshold value θ th (YES is obtained in step S204), the process proceeds to step S208. In step S208, the wheel cylinder pressure is regulated according to the change in the load distribution to the wheels caused by the gradient of the ascending road. Initially, it is determined whether the wheel to be controlled, according to the flowchart of FIG. 6, is located on the upper side of the ascending road or the lower side of the ascending road. Namely, the load applied to the wheels located on the upper side of the ascending road is different from the load applied to the wheels located on the lower side of the ascending road. For instance, when the vehicle runs up the ascending road, the front wheels FL, FR are located on the upside of the ascending road while the rear wheels RL, RR are located on the downsides of the ascending road, and when the vehicle runs down the ascending road, the rear wheels RL, RR are located on the downside of the ascending road while the front wheels FL, FR are located on the upside of the ascending road.

If the wheel is located on the upside of the ascending road surface ("YES" in step S208), the process proceeds to step S210 in which the target pressure P is set to the predetermined value P1. If the wheel is located on the downside of the ascending road surface (NO in step S208), the process proceeds to step S212 in which the target pressure is set to the predetermined value P2 (P2>P1).

Described is one example of a change in pattern of a target pressure distribution applied to the front wheels and the rear wheels of a vehicle, when the vehicle is running up an ascending road surface. When the estimated gradient θ is equal to or smaller than the threshold value θ th, that is, a relatively gentle gradient, a target value Pf1 is set to the front wheels while a target value Pr1 is set to the rear wheels. On the other hand, if the estimated gradient θ is larger than the threshold value θ th, a target value Pf2 is set to front wheels while a target value Pr2 is set to the rear wheels. In the case where the vehicle runs up the ascending road surface, the load applied to the rear wheels increases while the load applied to the front wheels decreases as the gradient of the ascending road surface increases. In view of this, the target value Pr2 is set to be larger than the target value Pr1. It is possible to increase the target value Pr2 as the gradient of the ascending road surface increases. In addition, the target value Pf2 may be set to be smaller than (Pf1/Pr1)*Pr2, that is, Pf2<(Pf1/Pr1)*Pr2.

The target pressures P1, P2 are predetermined in steps S210 and S212, respectively so as to satisfy the aforementioned relationship. Since the flowchart of FIG. 7 illustrates the control routine executed with respect to one wheel, the target pressures P1, P2 are set for the front wheels and the rear wheels, respectively.

When the target pressure value P is appropriately set in accordance with the gradient θ of the ascending road surface, the process proceeds to step S214. In step S214, a currently selected gear position of the transfer 3 is read on the basis of the output signals received from the selected-gear-position-detecting switch 150, which is adapted to detect a position of a shift lever that is operable for selecting operating positions of the transfer 3.

In subsequent step S216, it is determined whether the high-gear position for the high-speed transmission is selected in the transfer 3. In the case where the high-gear position is selected, as the gear ratio of the high-gear position is relatively low, the vehicle is likely to slip downward on the ascending road. Accordingly when the high-gear position is selected, YES is obtained in step S216. Then, the process proceeds to step S218 in which the target value P, set in step S206, S210 or S212, is set by adding a predetermined compensation value P3 to the target value P. The process proceeds to step S220. Since the target pressure P is compensated, i.e., increased by the value of P3, a further increased braking force is applied to the wheel to be controlled, thus preventing the increase in the backward slipping speed of the vehicle. On the other hand, when the low gear position for the low-speed transmission is selected in the transfer 3, NO is obtained in step S216. Then the process proceeds directly to step S220 without updating the target pressure value P. The control executed in steps S216 and S218 makes it possible to apply a suitable braking force to the wheel depending upon the slipping condition of the vehicle, which is changed depending upon the selected gear position of the transfer 3. In step S220, an acceleration α at which the vehicle is slipping backward on the surface of the ascending road is estimated. For example, a vehicle running speed is estimated by obtaining an average value of the rotating speeds of the wheels rotating backward of the ascending road. Then the acceleration α of the vehicle can be estimated on the basis of a magnitude of a change in the estimated vehicle running speed per unit time.

In step S222, it is determined whether the estimated acceleration α is larger than a predetermined threshold value α th. When the acceleration α is equal to or smaller than the predetermined threshold value α th, NO is obtained in step S222, and the process proceeds to step S226 without updating the target pressure P.

On the other hand, when the acceleration α is larger than the predetermined threshold value α th, YES is obtained in step S222, and the process proceeds to step S224. In step S224, the target pressure P is updated by adding a compensation value P4. Since the target pressure P is compensated, that is, increased by the P4, a further increased braking force is applied to the wheel to be controlled. Since the target value P is determined by taking into account of the acceleration α of the vehicle running speed, the control executed in steps S220 through S224 is allowed to perform a feedback control. Therefore, the braking force applied to the wheel to be controlled can be more adequately determined. In addition, the control executed in steps S220 through S224 makes it possible to apply a relatively large braking force upon the starting of the backward slipping of the vehicle. As a result, the increase in the slipping speed of the vehicle can be effectively moderated.

When the target pressure P is determined, the process proceeds to step S226 in which the brake actuator 200 is operated on the basis of the determined target pressure P, and then the control scheme of the flowchart shown in FIG. 7 is terminated.

In the flowchart of FIG. 7, the target pressure P is compensated in steps S222 and S224, when the acceleration α of the vehicle running speed is larger than the threshold value α th. Alternatively, the compensation value P4 is set in accordance with the acceleration α such that the greater the increase in acceleration α, the greater the compensation value P4 becomes.

Further, with respect to the running condition control system according to this embodiment of the invention, the pressure regulating valve 230 is operated based on the drive control signal having a duty ratio of 10% during a time when the counter value T exceeds the Ta and is equal to or less than the Tb, that is, Ta<T≦Tb. The duty ratio, however, does not have to be kept constant so long as the resultant pressure decompressed gradient is lower than the pressure decompressed gradient represented by the chain line "a" shown in FIG. 5. For instance, the duty ratio of the drive control signal may be gradually changed.

Further, the actual running direction of the vehicle detected in step S104 need not be determined exactly as discussed above. For instance, when three wheels are rotating in the same direction, that direction may be determined as the actual running direction of the vehicle. In the case of a 2-wheel-drive motor vehicle, a rotating direction of an idler wheel, i.e., the driven wheel, may be determined as the actual running direction of the vehicle.

In addition, the actual running direction of the vehicle may be directly detected using a ground speed sensor. More specifically, the ground speed sensor installed on the vehicle generates an ultrasonic signal at a predetermined frequency toward the road surface and back toward the vehicle, which receives the reflected wave. When the frequency of the reflected wave is higher than that of the ultrasonic signal, it can be determined that the vehicle is in a reverse drive operation. When the frequency of the reflected wave is lower than that of the ultrasonic signal, it can be determined that the vehicle is in a forward drive operation.

In the second embodiment, the control routine shown in the flowchart of FIG. 6 starts when the ignition switch is turned ON. The control routine may be started, for example, when the shift lever is selected on any one of forward or reverse shift positions, and the brake pedal 10 and the acceleration pedal are not depressed.

In the second embodiment, the braking force is controlled by the pressure of the working fluid. However, the braking force may be controlled by operating an electronic motor brake to generate a braking force. In this case, when the counter value T exceeds the Ta and is equal to or less than the Tb, that is, Ta<T≦Tb, the moderate pressure decreasing control is executed such that the braking force generated by the electronic braking system is gently decreased and thus, having a pressure-force decreasing gradient lower than that of the gradient of the normal terminating operation.

Embodiment 3

A running condition control system according to a third preferred embodiment of the invention will be described.

Figure 8:
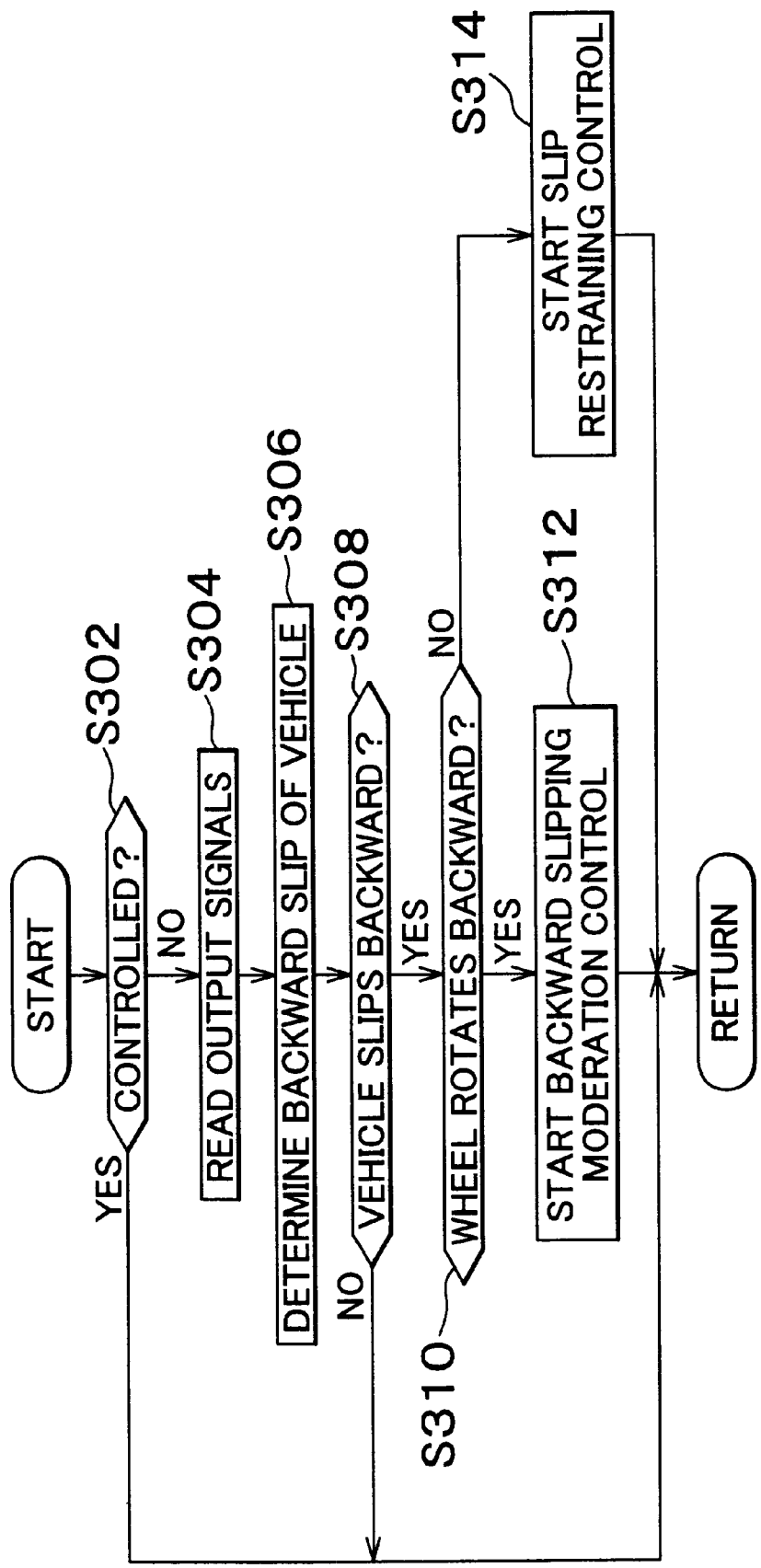
FIG. 8 is a flowchart illustrating a control routine of backward slipping moderation control according to a third embodiment of the invention.

When a vehicle is slipping backward on an ascending road surface, the operator would depress the acceleration pedal to drive the vehicle forward. If the vehicle is running on the ascending road having a low $\mu$, e.g., a frozen road, at least one wheel of the vehicle may spin. FIG. 8 is a flowchart illustrating a control routine for moderating the backward slipping state of the vehicle while at least one wheel is spinning. Since the wheels of the vehicle are controlled individually, the flowchart of FIG. 8 is illustrated with respect to one wheel in the same way as the flowcharts shown in FIGS. 6 and 7.

The control routine of the flowchart shown in FIG. 8 starts when the ignition switch is turned on. In step S302, it is determined whether the backward slipping moderation control executed in step S312 and/or a slip limitation control executed in step S314 are executed. When one of the backward slipping moderation control and the slip limitation control is executed, the control routine is terminated without executing the following steps.

If neither the backward slipping moderation control executed in S312 nor the slip limitation control executed in S314 are executed, NO is obtained in step S302. The process then proceeds to step S304 where the output signals generated from the sensors 110, 120, 130, 140, 160 and the switch 150 shown in FIG. 3 are read.

In step S306, it is determined whether the vehicle is slipping backward on the ascending road surface on the basis of the read output signals. In the aforementioned case, where the vehicle slips backward on the low-$\mu$, road surface with at least one wheel spinning, the rotating directions of the wheels FL, FR, RL, RR do not coincide with one another. Accordingly, when the rotating direction of at least one wheel of the vehicle does not coincide with those of the remaining wheels, it can be determined that the vehicle is slipping backwards. This arrangement makes it possible to determine a slipping condition of the vehicle earlier as compared with the use of a difference between the wheel speeds.

Alternatively the backward slipping state of the vehicle may be determined when the vehicle running direction, intended by the operator, is not the same as the actual running direction of the vehicle, as executed in steps S102, S104 and S114 of the flowchart shown in FIG. 6. The backward slipping state of the vehicle may be determined when at least one wheel of the vehicle rotates in the direction contrary to the intended running direction of the vehicle.

After determining whether the vehicle is slipping backwards in step S306, the process proceeds to step S308 where it is confirmed whether the vehicle is slipping backward. When it is determined that the vehicle is not slipping backwards, that is, NO is obtained in step S308, the control routine is terminated. When it is determined that the vehicle is slipping backward, that is, YES is obtained in step S308, the process proceeds to step S310.

In step S310, it is determined whether the wheel to be controlled, by the control routine, is rotating in the direction in which the vehicle is slipping backwards. If the wheel is rotating in the direction in which the vehicle is slipping backward, YES is obtained in step S310, and the process proceeds to step S312 in which the backward slipping moderation control is started. When the wheel is rotating in the direction contrary to the backward slipping direction, it may be determined that the wheel is spining on the surface of a low-$\mu$ road owing to a low friction coefficient. In this case, NO is obtained in step S310, and the process proceeds to step S314 in which the slip limitation control is started.

Once the control in step S312 or in step S314 is started, YES is obtained in step 302 and the control routine is terminated without executing subsequent steps S304 to S314. When the control started in step S312 or step S314 is terminated, NO is obtained in step S302, and the process proceeds to step S304 and subsequent steps.

Figure 9:
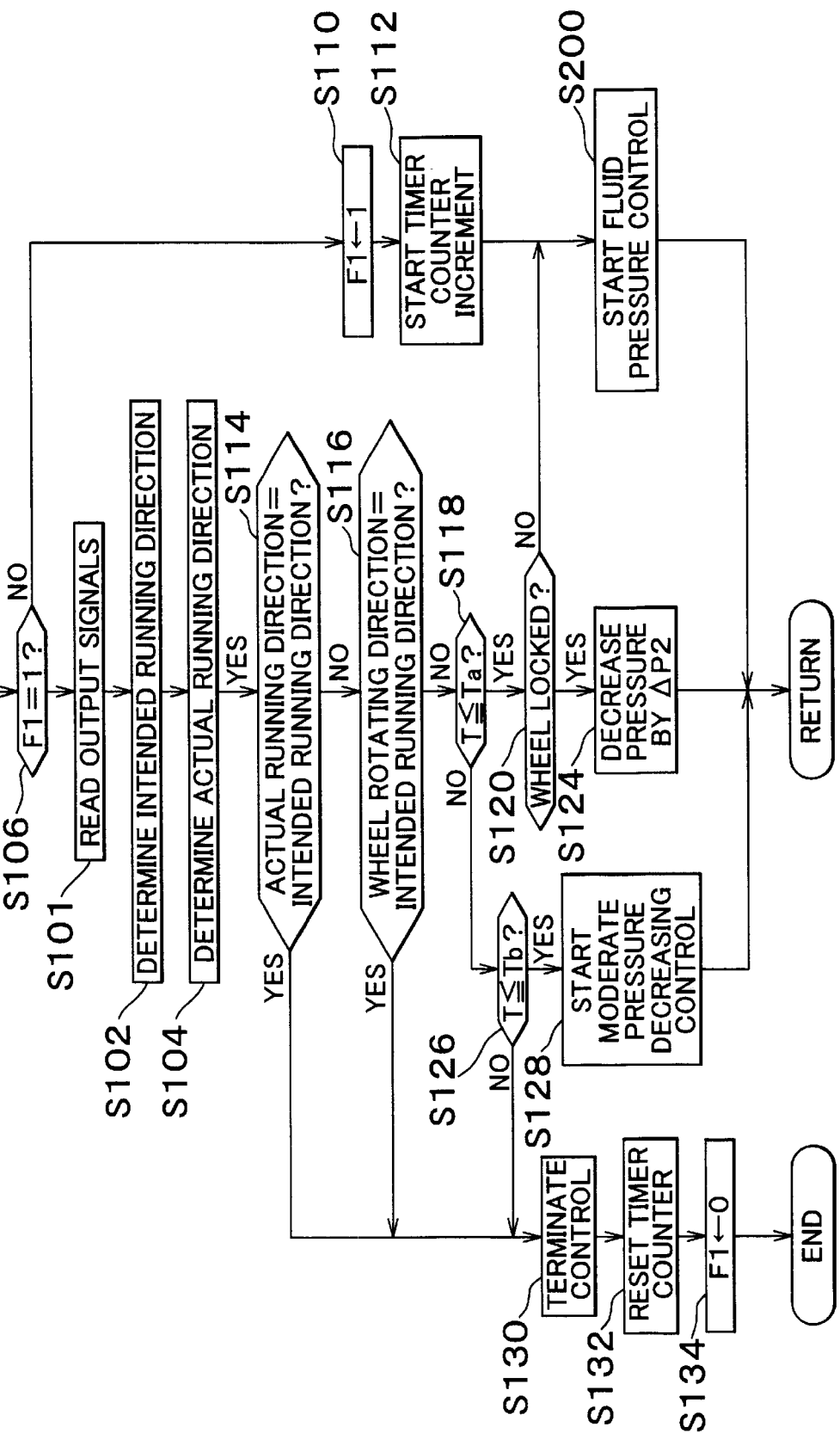
FIG. 9 is a flowchart illustrating one example of a backward slipping moderation control sub-routine to be executed in step S312 of the flowchart shown in FIG. 8.

FIG. 9 shows a flowchart illustrating the backward slipping moderation control routine executed in step S312. The control routine of the flowchart shown in FIG. 9 is substantially the same as the control routine of the flowchart shown in FIG. 6. Therefore, the same reference numerals used in the flowchart shown in FIG. 6 are used for the corresponding steps of the flowchart shown in FIG. 9.

In the flowchart of FIG. 9, step S108 of FIG. 6 is omitted. Upon the start of the control routine of the flowchart of FIG. 9, in step S106, it is determined whether the flag F1 is set to 1 in order to confirm the state of the backward slipping moderation control. Since the flag F is set to 0 immediately after the start of this control routine, NO is obtained in step S106, and then the process proceeds to step S110 in which the flag F is reset to 1 so as to indicate that the backward slipping moderation control is executed. Then in step S112, the timer counter is started for measuring the time elapsing after the start of the backward slipping moderation control. The process proceeds to step S200 in which the fluid pressure control that has been described referring to FIG. 6 is executed.

In the next cycle of the control routine, as the flag F1 has been set to 1, YES is obtained in step S106, and the process proceeds to step S101. Then step S101 and subsequent steps are executed as shown in the flowchart shown in FIG. 6.

As shown in the flowchart of FIG. 4, termination of the control termination is executed, in steps S130 to S134 of the flowchart shown in FIG. 9, during repetitive executions of the routine, when the actual running direction of the vehicle is the same as the intended running direction (YES in step S114), when the rotating direction of the wheel is the same as the intended running direction (YES in step S116), and when the timer counter value T exceeds the threshold value Tb (NO in step S126).

In addition, the backward slipping moderation control is also terminated through steps S130 to S134 upon the detection of the depression of the brake pedal 10.

Figure 10:
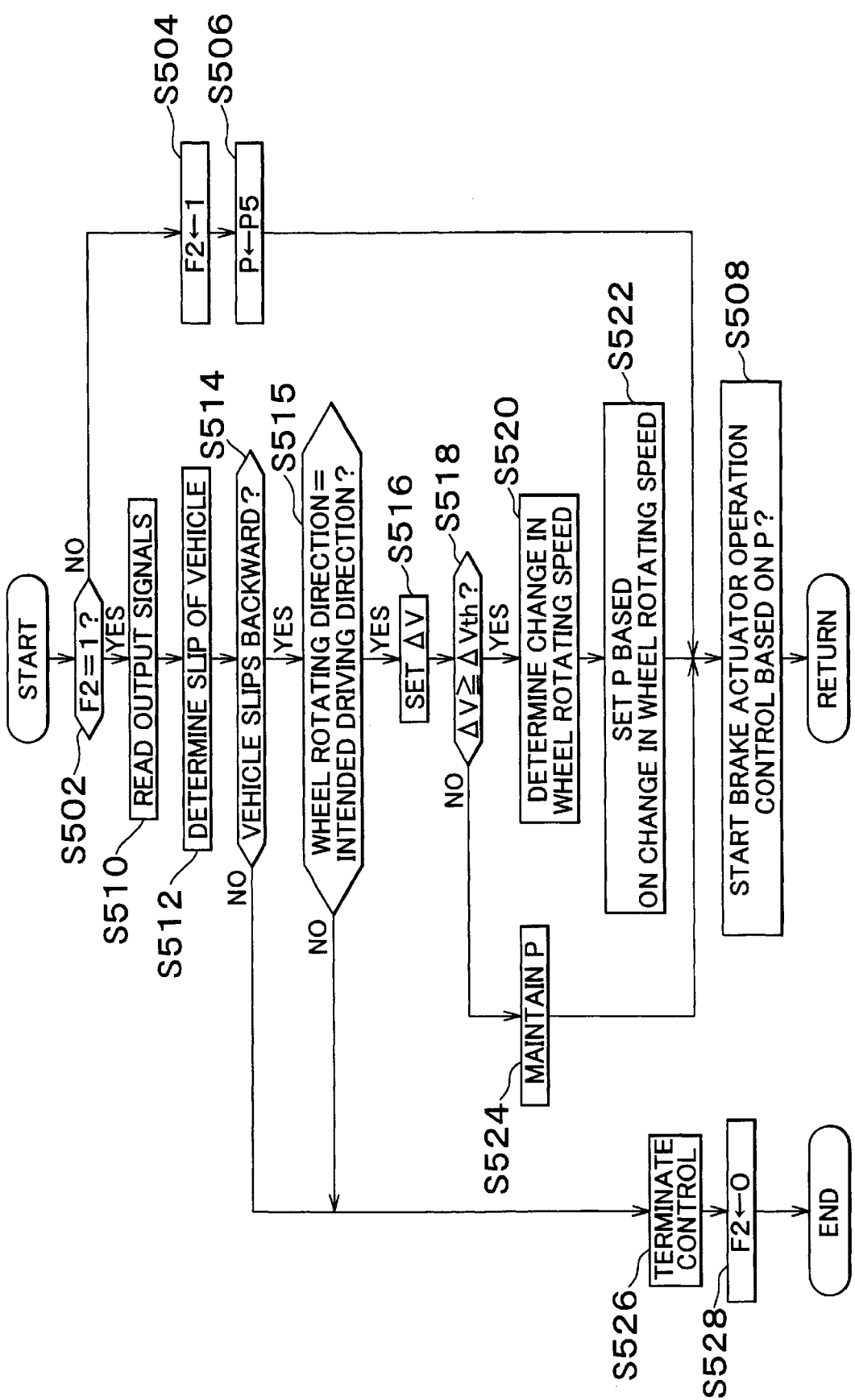
FIG. 10 is a flowchart illustrating one example of a slip limitation control sub-routine to be executed in step S314 of the flowchart shown in FIG. 8.

FIG. 10 shows a flowchart illustrating a control routine of the slip limitation control to be executed in step S314 of the flowchart shown in FIG. 8.

Upon the start of the flowchart shown in FIG. 8, in step S502, it is determined whether a flag F2 is set to 1 to indicate that the slip limitation control is executed. Since the flag F2 is set to 0 immediately after the start of this control routine, NO is obtained in step S502, and the process proceeds to step S504 to set the flag F2 to 1 so as to indicate that the slip limitation control is executed. In step S506, a predetermined pressure value P5 is set to the target pressure P (i.e., the target wheel cylinder pressure). The predetermined pressure value P5 is set to be used for limiting or restricting slipping of the vehicle. In step S508, the operation of the brake actuator 200 is controlled on the basis of the target pressure P set in step S506.

In the next cycle of the control routine, since the flag F2 has been set to 1, YES is obtained in step S502, and the process proceeds to step S510 to read output signals generated from the sensors 110, 120, 130, 140, 160 and the switch 150.

In step S512, it is determined whether the vehicle is slipping backwards on the ascending road, on the basis of the output signals of the sensors 110, 120, 130, 140, 160 and the switch 150. Like step S306 of the flowchart shown in FIG. 8, in step S512 of the flowchart shown in FIG. 10, it is determined whether the rotational directions of all wheels FL, FR, RL, RR coincide with one another. If they do not coincide, it is determined in step S512 that the vehicle is slipping backward. Alternatively, it may be determined that the vehicle is slipping backward when the intended running direction is not the same as the actual running direction of the vehicle. It is also possible to determine that the vehicle is slipping backward if at least one wheel of the vehicle is rotating in the direction contrary to the intended running direction.

In subsequent step S514, it is confirmed that whether the backward slipping of the vehicle has been determined in step S512. When the backward slipping of the vehicle has been determined in step S512, YES is obtained in step S514. The process then proceeds to step S515.

In step S515, it is determined whether the wheel to be controlled by the routine of the flowchart shown in FIG. 10 is rotating in the direction that coincides with the vehicle's intended running direction. The execution in step S515 is incorporated in this slip limitation control routine to cope with a change in the frictional condition of the road surface, on which the wheel is held in contact with, as the vehicle slips backward. For example, in the case where the vehicle slips backward on the surface of the ascending road which is partially frozen, while the vehicle is slipping backward, the rotating direction of the wheel may be reversed at a time when the wheel moves from the non-frozen area to the frozen-area of the road surface. Thus, the wheel starts rotating in the direction in which the vehicle is slipping backwards. Therefore, when the wheel starts rotating in the backward slipping direction, NO is obtained in step S515, and the process proceeds to step S526 to terminate the control routine of the slip limitation control. In this case, the process proceeds back to step S312 of the flowchart shown in FIG. 8 in order to start the backward slipping moderation control.

Likewise, the change in the frictional condition of the road surface may cause spinning of the wheel that is rotating in the direction in which the vehicle is slipping backwards. In this condition, the rotational direction of the wheel coincides with the intended running direction. Accordingly, YES in obtained in step S116 of the flowchart shown in FIG. 8. Next, step S130 and the following steps are executed to terminate the backward slipping moderation control. When the backward slipping moderation control is terminated, the process proceeds back to step S314 of the flowchart shown in FIG. 8 to start the slip limitation control.

Referring back to FIG. 10, when the rotational direction of the wheel coincides with the intended naming direction, YES is obtained in step S515. The process proceeds to step S516 to set a slipping amount $\Delta V$ of the wheel to be controlled. A traction control is known as a typical control for limiting slipping of the wheel. The traction control functions to limit an amount of the acceleration slip, which is likely to be caused when starting or accelerating the vehicle. Generally, a deviation between a reference rotating speed of the wheel, obtained on the basis of a target slip ratio and the estimated vehicle running speed, and the actual rotating speed of the wheel is obtained. The amount of deviation between the reference rotating speed and the estimated vehicle running speed is set as the slipping amount $\Delta V$ of the wheel. However, the control routine of the flowchart shown in FIG. 10 is intended to be executed for the condition in which the vehicle is slipping backwards on the ascending road surface while a wheel is spinning. Thus, the condition for which the control routine is to be used differs from the condition based on which the traction control is executed. Therefore, the detected rotating speed of the wheel is expediently set to the slipping amount $\Delta V$ of the wheel, as shown in the control routine of the flowchart of FIG. 10. This arrangement substantially corresponds to the presumption that the estimated vehicle running speed is zero.

In step S518, it is determined whether the slipping amount $\Delta V$ set in step S516 is equal to or smaller than a threshold value $\Delta V$th. When the slipping amount $\Delta V$ is smaller than the threshold value $\Delta V$th, e.g., the wheel is brought into a lock state, (NO in step S518), and the process proceeds to step S524. In step S524, the target pressure P selected in the last cycle of the control routine is maintained as the target pressure P for the current cycle of the control routine.

The process proceeds to step S508 in which the operation control of the brake actuator 200 is executed on the basis of the target pressure P set in step S524.

When the slipping amount $\Delta V$ is equal to or greater than the threshold value $\Delta V$th, YES is obtained in step S518, and then the process proceeds to step S520. In step S520, the change in the rotating speed of the wheel which is to be controlled is confirmed according to the flowchart shown in FIG. 10. For this, the deviation between the slipping amount ΔV set in step S516 in the last cycle of the control routine and the slipping amount ΔV set in step S516 in the current cycle of the control routine is obtained. Then a time interval between the last step S516 and the current step S516 is also obtained. Based on the obtained deviation and the time interval, an acceleration of the wheel is obtained. It is determined as to which state the obtained acceleration is changed, i.e., "+", "−" or "0" as shown in FIG. 11. If an absolute value of the acceleration of the wheel is a predetermined small value (variation of the rotating speed of the wheel is held in a predetermined minute range), it is determined that no increase or decrease in the acceleration of the wheel is required. On the other hand, if the absolute value of the acceleration of the wheel increases or decreases to deviate from the predetermined range, the acceleration is determined as (+) or (−)

In step S522, the target pressure P is set in accordance with the determined state (+, −, 0) of the change in the acceleration of the wheel in step S520, referring to a diagram shown in FIG. 11. As is apparent from the diagram of FIG. 11, if the acceleration of the wheel decreases (−), the target pressure P is maintained, namely, the pressure value P, as set in the last cycle of the control routine, is set to the pressure value P for the current cycle of the control routine. If the acceleration of the wheel is held substantially constant (0), the target pressure P is increased, namely, a predetermined pressure P6 (P6>0) is added to the pressure value P as set in the last cycle of the control routine, and then the obtained pressure value (P+P6) is set to the pressure value P for the current cycle of the control routine. If the acceleration of the wheel increases (+), the target pressure P is rapidly increased, namely, a predetermined pressure P7 (P7>P6) is added to the pressure value P as set in the last cycle of the control routine, and then the obtained pressure value (P+P7) is set to the pressure value P for the current cycle.

After the target pressure P is determined in step S522, the process proceeds to step S508 in which the operation of the brake actuator 200 is controlled on the basis of the target pressure P set in step S522.

When the vehicle stops slipping backward resulting from the repetitive execution of the aforementioned control routine, NO is obtained in step S514, and the process proceeds to step S526. In step S526, a predetermined control termination is executed, and the process proceeds to step S528. In step S528, the flag F2 is set from 1 to 0, terminating the slip limitation control.

The slip limitation control allows the braking system 20 to apply the braking force to the wheel that is spinning so as to prevent slipping of the wheel. That is, the slip limitation control functions as a limited slip differential, which limits the wheel slipping. When the vehicle is provided with no limited slip differential, the slip limitation control serves to prevent loss of the drive torque of the spinning wheel, while preventing reduction of the torque to be applied to the non-spinning wheel.

When the vehicle starts driving in the direction intended by the operator having a spinning wheel, the aforementioned traction control will be started to limit the acceleration slip of the vehicle.

In the third embodiment, the brake actuator in the vacuum booster brake system is employed as shown in FIG. 2. Any type of brake actuator may be employed so long as the brake actuator is capable of applying a braking force apart from the braking operation performed by the operator of the vehicle. Therefore, a brake actuator of a hydro-booster type braking system and an actuator capable of generating the braking force based on an operation of the motor may be employed.

The wheel speed sensor 110 employed in this embodiments is able to detect both the rotating speed and the rotating direction of the wheel. The wheel speed sensor 110, however, may be constituted by a sensor which is able to detect only a rotating speed of one wheel, and another sensor adapted to detect a rotating direction of the wheel may be provided apart from the wheel speed sensor 110.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A running condition control system for controlling a braking force applied to a vehicle when an actual running direction of the vehicle is contrary to a running direction in which the vehicle is intended to run in accordance with a vehicle operation state selected by an operator of the vehicle, comprising:

a vehicle operation state detector that determines whether the vehicle operation state selected by the operator is a forward driving operation or a reverse driving operation;

an actual running direction detector that detects an actual running direction of the vehicle;

a braking device that applies a braking force to a predetermined wheel apart from a braking operation performed by the operator;

and a controller that:

controls the braking device to apply the braking force to a wheel which is rotating in a same direction as the actual running direction of the vehicle when the running direction of the vehicle intended by the operator, which is determined by the operation state detector, is contrary to the actual running direction of the vehicle detected by the actual running direction detector, and stops controlling the braking device to stop the application of the braking force when the braking device has been continuously controlled for a first predetermined period of time.

2. A running condition control system according to claim 1, wherein the vehicle operation state is determined on the basis of a position of a shift lever of the vehicle selected by the operator.

3. A running condition control system according to claim 1, wherein the actual running direction is determined on the basis of a rotating direction of at least one wheel of the vehicle.

4. A running condition control system according to claim 1, wherein the braking force is controlled by a hydraulic pressure of a working fluid of the vehicle.

5. A running condition control system according to claim 1, wherein the braking force is controlled by an electronic motor brake employed in the vehicle.

6. A running condition control system according to claim 1, wherein when the wheel to which the braking force is applied is in a locked state, a pressure applied to a wheel cylinder of the wheel is reduced by a predetermined value.

7. A running condition control system according to claim 1, wherein when the braking force has been continuously controlled for a period of time that is larger than a second period of time that is set smaller than the first period of time, the braking force applied to the wheel is reduced gradually.

8. A running condition control system according to claim 1, wherein the controller controls the magnitude of the braking force applied to the wheel, and the magnitude of the braking force applied is changed based on the magnitude of an acceleration state of the vehicle in the actual running direction.

9. A running condition control system according to claim 8, wherein the controller distributes the braking force applied to the wheels located on an upper side of an inclined road and the wheels located on a lower side of the inclined road such that the braking force applied to the wheels located on the lower side of the inclined road increases as a gradient of the inclined road increases.

10. A running condition control system according to claim 8, wherein a target pressure for controlling the wheel is determined on the basis of a gear position of the vehicle selected by the operator of the vehicle.

11. A running condition control system according to claim 10, wherein the target pressure for controlling the wheel is determined based on an acceleration of the vehicle.

12. A running condition control system according to claim 1, further comprising a rotating direction detector that detects a rotating direction of each of the wheels of the vehicle; wherein the controller:

applies a first braking force to at least one wheel rotating in a direction that is contrary to the running direction intended by the operator, which is detected by the rotating direction detector, and applies a second braking force to at least one wheel rotating in a direction that is the same as the running direction intended by the operator, apart from a braking operation performed by the operator, wherein:
the first braking force applied to the at least one wheel rotating in the direction that is contrary to the running direction intended by the operator is determined depending upon a running state of the vehicle; and
the second braking force applied to the at least one wheel rotating in the direction that is the same as the running direction intended by the operator is determined depending upon a rotating state of the wheel.

13. A running condition control system according to claim 12, wherein the controller controls the magnitude of the braking force applied to the wheel, and the magnitude of the braking force applied is changed based on the magnitude of an acceleration state of the vehicle in the actual running direction.

14. A running condition control system according to claim 12, wherein the controller distributes the braking force applied to the wheels located on an upper side of an inclined road and the wheels located on a lower side of the inclined road such that the braking force applied to the wheels located on the lower side of the inclined road increases as a gradient of the inclined road becomes high.

15. A method for controlling a braking force applied to a vehicle when an actual running direction of the vehicle is contrary to a running direction in which the vehicle is intended to run in accordance with an operation selected by an operator of the vehicle, comprising:

detecting whether the operation selected by the operator is a forward driving operation or a reverse driving operation;

detecting an actual running direction of the vehicle;

applying a braking force to a predetermined wheel apart from a braking operation performed by the operator;

controlling the braking force applied to a wheel which is rotating in a same direction as the actual running direction of the vehicle when the running direction of the vehicle intended by the operator is contrary to the actual running direction of the vehicle; and stopping the application of the braking force when the braking force has been continuously controlled for a first predetermined period of time.

16. A method for controlling a braking force applied to a vehicle according to claim 15, further comprising:

controlling the magnitude of the braking force applied to the wheel, wherein the magnitude of the braking force applied is changed based on the magnitude of an acceleration state of the vehicle in the actual running direction.

17. A method for controlling a braking force applied to a vehicle according to claim 16, further comprising:

controlling the distribution of the braking force applied to the wheels located on an upper side of an inclined road to the wheels located on a lower side of the inclined road such that the braking force applied to the wheels located on the lower side of the inclined road increases as a gradient of the inclined road becomes high.

* * * * *

UNITED STATES PATENT AND TRADEMARK OFFICE
CERTIFICATE OF CORRECTION

PATENT NO. : 6,644,454 B2
DATED : November 11, 2003
INVENTOR(S) : Noritaka Yamada et al.

It is certified that error appears in the above-identified patent and that said Letters Patent is hereby corrected as shown below:

<u>Title page,</u>
Item [73], should read as follows:
-- [73]  Assignees:  Toyota Jidosha Kabushiki Kaisha, Toyota (JP);
 Aisin Seiki Kabushiki, Kariya, (JP) --

Signed and Sealed this

Twenty-ninth Day of June, 2004

JON W. DUDAS
*Acting Director of the United States Patent and Trademark Office*